Figure 1:
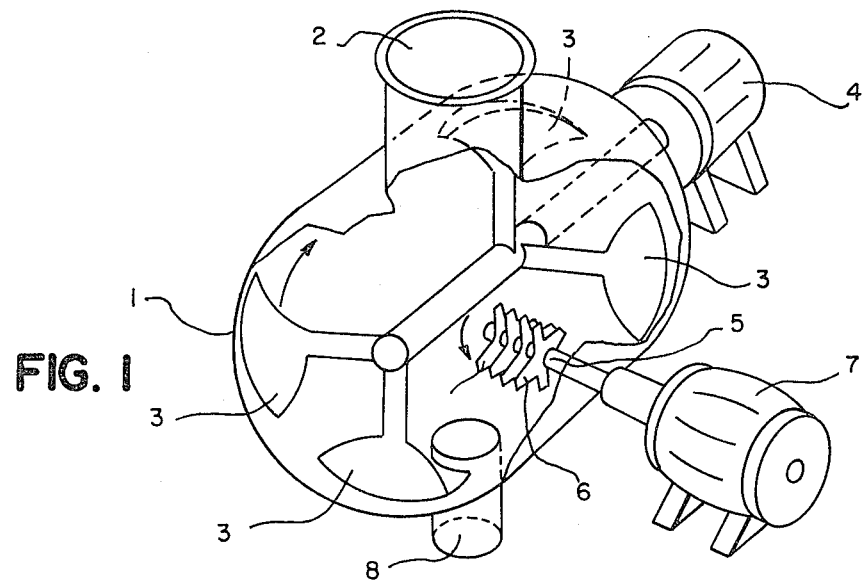

United States Patent [19]

Sauer

[11] 4,336,217
[45] Jun. 22, 1982

[54] CONTINUOUS PRODUCTION OF GAS DIFFUSION ELECTRODES

[75] Inventor: Hans Sauer, Idstein-Walsdorf, Fed. Rep. of Germany

[73] Assignee: Varta Batterie A.G., Hanover, Fed. Rep. of Germany

[21] Appl. No.: 197,215

[22] Filed: Oct. 15, 1980

[30] Foreign Application Priority Data

Oct. 16, 1979 [DE] Fed. Rep. of Germany ....... 2941774

[51] Int. Cl.³ .............................................. B05D 5/12
[52] U.S. Cl. .................................. 264/105; 427/115; 427/122; 427/221; 524/546
[58] Field of Search ................ 264/105; 427/221, 115, 427/122

[56] References Cited

U.S. PATENT DOCUMENTS

| | | | |
|---|---|---|---|
| 3,457,113 | 7/1969 | Deibert | 429/13 |
| 3,694,243 | 9/1972 | Campbell | 427/221 |
| 3,706,601 | 12/1972 | Strier et al. | 264/104 |
| 3,970,571 | 7/1976 | Olson et al. | 427/221 |
| 4,233,387 | 11/1980 | Mammino | 427/221 |

FOREIGN PATENT DOCUMENTS 2161373  6/1973  Fed. Rep. of Germany .

*Primary Examiner*—James H. Derrington
*Attorney, Agent, or Firm*—Weiser, Stapler & Spivak

[57] ABSTRACT

In the continuous manufacture of plastic-cohered gas diffusion electrodes, and particularly air electrodes, in the form of thin foils, a dry mixture of PTFE and active carbon powder is subjected, during the mixing process in a paddle mixer, to the additional intensive influence of rapidly rotating cutting knives. The degree of subdivision and homogeneity of the dry mixture is thereby enhanced to such a degree that, in the finished electrode tape, the mass does not exhibit nonuniform thickening.

8 Claims, 2 Drawing Figures

CONTINUOUS PRODUCTION OF GAS DIFFUSION ELECTRODES

The invention relates to a method and apparatus for manufacturing a plastic bonded active carbon layer for thin gas diffusion electrodes and particularly for air electrodes.

Heretofore, active carbon powder has been found suitable as the active material for the construction of gas diffusion electrodes in fuel cells, and particularly also of air electrodes, by being pressed or rolled onto a metallic take-off conductor mesh in mixture with an organic binder.

The preparation of the active carbon/binder mixture previously took place in inconvenient manner by a "wet" process. This involved introducing the active carbon into a solution of the binder in an organic solvent and then stirring, until after evaporation of the solvent a homogeneous mass existed. However, after pressing in in an inert atmosphere, this still had to be after-dried for removal of the last remanents of liquid.

From U.S. Pat. Nos. 3,457,113 and 3,706,601, it is also known to introduce the binder, e.g. polytetrafluoroethylene (PTFE) either via an aqueous dispersion or via an organic solvent. In this process extended drying times and drying temperatures between 60° and 100° C. are necessary, particularly for the subsequent water removal, and this severely hampers continuous production of the electrodes. For aqueous dispersions there must also be driven off at temperatures up to about 240° C. additional wetting agents which are present and which frequently consist of high boiling point polyethers.

An improvement over this involves proceeding in accordance with German patent publication (Offenlegungsschrift) 2,161,373 by mixing the active material with polytetrafluoroethylene powder in the dry state. The dry mixture is immediately thereafter pressed onto the metallic supporting member. In so doing, there is avoided any heat treatment having as its object the plastifying of the plastic in order to strengthen the electrode.

Accordingly, the procedure described in German patent publication (Offenlegungsschrift) No. 2,161,373, has the advantage of requiring little technological effort. In addition, there are obtained electrodes of good electrochemical activity because of the absence of elevated treatment temperatures and because there does not take place coverage of an unnecessarily large surface of the mass particles by plastified binder.

However, all previously used dry mixtures are beset by the problem that they have a strong tendency to adhere and to clump together. If the powder accumulation is rolled directly into the take-off conductor mesh, even the slightest nonuniformities in the application often lead to varying thickening of the mass.

Accordingly, it is an object of the invention to provide a process for producing thin and hydrophobic gas diffusion electrodes which are significantly freer of the above-mentioned problems, and which is particularly suitable for continuous manufacture.

This and other objects which will appear are achieved in accordance with the present invention by subjecting a dry mixture of active carbon and polytetrafluoroethylene powder in a paddle mixer, prior to rolling or pressing, additionally to the intensive subdividing effect of rapidly rotating sharp knives of a blender. In so doing, the polytetrafluoroethylene temporarily vaporizes, at least partially.

For the further processing of the dry mixture in a roller system, and for the quality of the finished product, the mixing process which takes place at the beginning is of a great importance.

Figure 2:
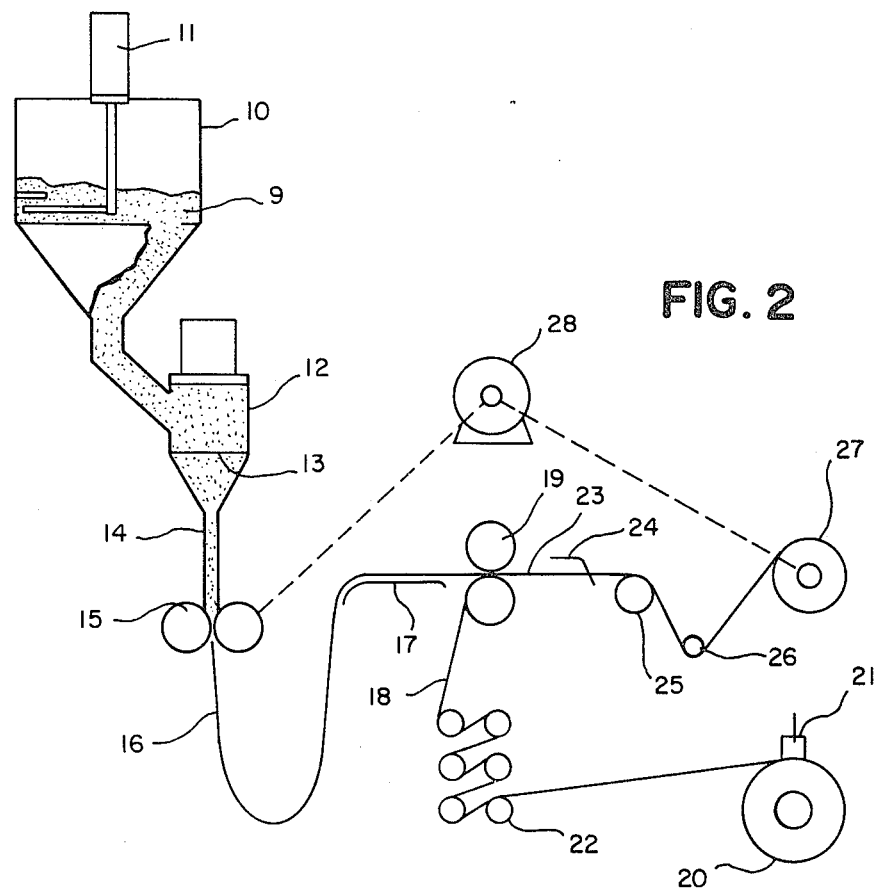

For further details, reference is made to the discussion which follows in light of the accompanying drawings wherein FIG. 1 shows in diagrammatic form a paddle mixer embodying the invention; and FIG. 2 diagrammatically illustrate a roller system for the tape manufacture of gas diffusion electrodes which follows the paddle mixer of FIG. 1.

Referring to FIG. 1, the paddle mixer 1 shown therein is supplied through inlet port 2 with active carbon and PTFE powder in a weight relationship in accordance with the invention of 5:1, to 1:1 preferably 3:1 to 2:1. The ingredients may be provided separately or may be coarsely premixed. After activation of the mixer paddles 3 which rotate in two planes with a rate of rotation of about 80 rpm, driven by motor 4, there further intervene in the mixing process the rapidly rotating sharp knives 6 of a cutting head 5 driven by motor 7. In accordance with the invention, the peripheral velocity of knives 6 should be at least 15 m/sec, and preferably about 25 m/sec or higher. These values are obtained, for example, with knives having 150 mm diameter, i.e. length, when the rate of rotation of motor 7 equals about 3000 rpm. At this high speed, the cutting edges impinge upon the mixture particles with such intensity that especially the PTFE agglomorates which are still present are fractured into very fine particles. In so doing, there even takes place a partial vaporization of PTFE, which then precipitates elsewhere upon the carbon particles. After about 8 to 10 hours of treatment in accordance with the invention, there can be removed from outlet port 8 a completely homogeneous mixture with an extraordinarily high degree of subdivision. Even at 18-fold magnification, no PTFE particles remain observable.

The further processing of the finished mixture 9 takes place in the roller system of FIG. 2. There it starts out in storage container 10 which has a drive 11 for powder transport. From there is proceeds into crusher 12 which utilizes a rapidly rotating disk 13 to counteract the tendency of the mixture to adhere and to clump. It assures that a pourable material is supplied to the powder roller 15 via inlet chute 14.

The powder roller 15 rolls the loosely poured active mass into a compact thin foil 16. Its thickness is 0.15 to 0.22 mm, preferably 0.16 to 0.18 mm. The surface weight of the foil is 15 mg/cm$^2$.

The foil then moves over sliding support 17 and into a second roller set 19, with simultaneous supply of a woven metal band 18. There the foil is pressed firmly into the meshes of the weave. The woven band is removed for this purpose from supply reel 20 having brake 21 and is tensioned by braking rollers 22. The finished electrode tape 23 which exits from roller set 19 is rolled up on reel 27, after passing an edge scraper 24, as well as a deflector roller 25, and a directing roller 26. A motor 28 provides the drive for roller sets 15 and 19, as well as reel 27.

The process embodying the invention and the apparatus provided for that purpose prevents the nonuniform application of the active material to the take-off conductor mesh, when that is applied in one step as a powder accumulation. The new process also counteracts the danger which was heretofore associated with nonuniform thickening of the active mass in the electode tape, and which is that the take off conductor may buckle or even tear as a result, particularly when very thin electrodes are produced.

I claim:

1. The process for manufacture of a plastic-cohered active carbon layer for gas diffusion electrodes, particularly air electrodes utilizing a paddle mixer and a cutting head with sharp knives, said process comprising subjecting a dry mixture of active carbon powder and polytetrafluoroethylene powder while it is still in the paddle mixer, before rolling or pressing, additionally to an intensive subdividing influence of the rotating sharp knives of the cutting head, whereby the polytetrafluoroethylene temporarily evaporates, at least partially, and deposits upon the carbon powder.

2. The process of claim 1 wherein
the peripheral velocity of the rotating knives is at least 15 m/sec.

3. The process of claim 2 wherein
the peripheral velocity is at least 25 m/sec.

4. The process of claim 1 wherein
the weight proportions of active carbon to polytetrafluoroethylene in the dry mixture are in the range of 5:1 to 1:1.

5. The process of claim 4 wherein
the proportions are in the range of 3:1 to 2:1.

6. The process of claim 1 further comprising
rolling the finished mixture by means of a powder roller into a thin foil, and
thereafter pressing the foil in a roller set into a woven metal band.

7. The process of claim 6 wherein
the foil exiting the powder roller has a surface weight of about 15 mg/cm$^2$, and a thickness of 0.15 to 0.20 mm.

8. The process of claim 7 wherein
the foil thickness is 0.16 to 0.18 mm.

* * * * *